United States Patent [19]

Isidoro et al.

[11] Patent Number: 5,384,771

[45] Date of Patent: Jan. 24, 1995

[54] MULTIMEDIA CALL CONFIGURATION SYSTEM

[75] Inventors: Alessandro L. Isidoro, Howell; Howard S. Tsai, Tinton Falls, both of N.J.

[73] Assignee: AT&T Corp., Murray Hill, N.J.

[21] Appl. No.: 112,276

[22] Filed: Aug. 27, 1993

[51] Int. Cl.$^6$ .................. H04J 3/16; H04L 12/18
[52] U.S. Cl. .................. 370/58.2; 370/62; 370/68.1; 379/158; 379/165; 379/202
[58] Field of Search .................. 370/58.1, 58.2, 60, 370/60.1, 62, 68.1, 79, 84, 94.1, 94.2, 110.1; 379/93, 94, 157, 158, 165, 201, 202, 205, 206, 243, 244, 269, 284

[56] References Cited

U.S. PATENT DOCUMENTS

| | | | |
|---|---|---|---|
| 4,713,806 | 12/1987 | Oberlander et al. | 370/58 |
| 4,720,850 | 1/1988 | Oberlander et al. | 379/90 |
| 5,065,392 | 11/1991 | Sibitt et al. | 370/62 X |
| 5,103,444 | 4/1992 | Leung et al. | 370/60 |
| 5,138,614 | 8/1992 | Baumgartner et al. | 370/62 |
| 5,295,139 | 3/1994 | Palmer | 370/68.1 X |

*Primary Examiner*—Melvin Marcelo
*Attorney, Agent, or Firm*—Robert P. Marley

[57] ABSTRACT

An improved system for effecting broadband/multimedia calls and connections within an intelligent switched telecommunication network. This system, which employs object-oriented commands, is capable of establishing complex call and connection configurations between multiple network subscribers participating in a broadband/multimedia call. These object-oriented commands, which are stored in and initiated from network adjuncts or service control points, eliminate the need for long series of individual low-level commands to be transmitted to the network switching system. Furthermore, the system provides for a finite set of object-oriented commands which are capable of implementing the many complex and diverse interconnections which may be required in effecting multi-party broadband/multimedia calls. This is accomplished by selectively combining various object-oriented commands to produce the connectivity which will support the desired broadband/multimedia call.

12 Claims, 1 Drawing Sheet

MULTIMEDIA CALL CONFIGURATION SYSTEM

TECHNICAL FIELD

The invention relates to telecommunication networks and, more particularly, to the switching of broadband and/or multimedia communications within such networks.

BACKGROUND OF THE INVENTION

Modern switched intelligent telecommunication networks typically comprise one or more central office switching systems trunked together, and connected to lines that which are directed to the various network subscribers. A variety of communication services are provided to the network subscribers via one or more service network elements connected to the switching systems. These services range from standard voice-band audio connections (also referred to as "narrowband" connections) established between two or more network subscribers, to broadband connections which allow subscribers to simultaneously exchange of audio, video, and/or digital data (such connections may be classified as "broadband/multimedia").

Within a switched telecommunication network, the network elements send predetermined commands to the switching systems relating to the particular service or services requested by a network subscriber. The switching systems configure themselves in response to the commands to effect the requested services. Despite wide acceptance of intelligent network architectures in principle, there has been no clear industry consensus on how to implement and deploy such systems. The most significant issues involved are the creation and control of complex call and connection configurations in the switching systems by the services network elements, along with resolution of interaction between commanded services and existing switching system features.

Existing methods of handling the complex control of intelligent switching systems (such as the method put forth in the Bellcore's "Advanced Intelligent Networks Technical Advisory," TA-NWT-001112, Issue 1, May 1991) require network elements, such as adjuncts and service control points ("SCPs"), to produce a set of low level service instructions to the switching system which directly manipulate call topology component resources in order to reach a desired switch configuration. These instructions directly manipulate low-level switching system resources and, therefore, contend for the use of these resources with existing switching system features. Typically, these low-level instruction sets do not follow any set pattern, and therefore result in difficult to solve feature interaction problems that directly impact all existing switch features. The required low-level transformations also are difficult to design and do not always naturally lead to a target switch configuration.

The drawbacks of this type of low-level, direct manipulation of an intelligent switching system are solved with respect to narrowband connections by the method and apparatus disclosed in co-pending U.S. patent application Ser. No. 07/880,727, filed on May 8, 1992 ("the '727 application"). Call processing within an intelligent switching system, per the '727 application, is effectively realized from a relatively small number of target call topologies, with the switching system producing transformations from one call topology to another. Such call topologies are implemented in the switching system as a set of call processing objects referred to as call configurations. The call configurations are entered into by the switching system in accordance with the commands of an object-oriented network services element that causes transformations from one call configuration to another by means of a relatively simple set of transfer commands (at least some of which represent a plurality of the low level commands similar to those proposed in the Bellcore Advisory).

Unfortunately, neither of these prior methodologies addresses the difficulties of establishing broadband-/multimedia connections within a switched intelligent network. To effect a broadband/multimedia connection, two separate configurations (a call configuration, and a connection configuration) are required. This is due to the fact that not all of the network subscribers participating in the call will require (or be capable of accommodating) the same type of connection to the network. For example, of the participants in an audio/video conference call, some might only require a bidirectional audio connection, others might need a bidirectional audio connection and an omnidirectional video connection, still others might require that bidirectional audio and video connections be established. Clearly, attempting to effect such a complex interconnection via the low-level instruction set of the Bellcore Advisory would require a large number of commands to be sent by network adjuncts and SCPs. Although the target call topologies disclosed in the '727 application offer an improvement over the low-level Bellcore instruction set, they are adapted for the establishment of narrowband connections. Consequently, these target call topologies are incapable of effecting and accommodating the various call and connection configurations required within a broadband/multimedia telecommunication network.

SUMMARY OF THE INVENTION

In accordance with the principles of the invention, an improved system for effecting broadband/multimedia calls and connections within an intelligent switched telecommunication network is provided. This system, which employs object-oriented commands, is capable of establishing complex call and connection configurations between multiple network subscribers participating in a broadband/multimedia call. These object-oriented commands, which are stored in and initiated from network adjuncts or SCPs, eliminate the need for long series of individual low-level commands to be transmitted to the network switching system. Furthermore, the invention provides for a finite set of object-oriented commands which are capable of implementing the many complex and diverse interconnections that may be required in effecting multi-party broadband/multimedia calls. This is accomplished by selectively combining various object-oriented commands to produce the connectivity which will support the desired broadband/multimedia call.

DETAILED DESCRIPTION OF THE INVENTION

Figure 1:
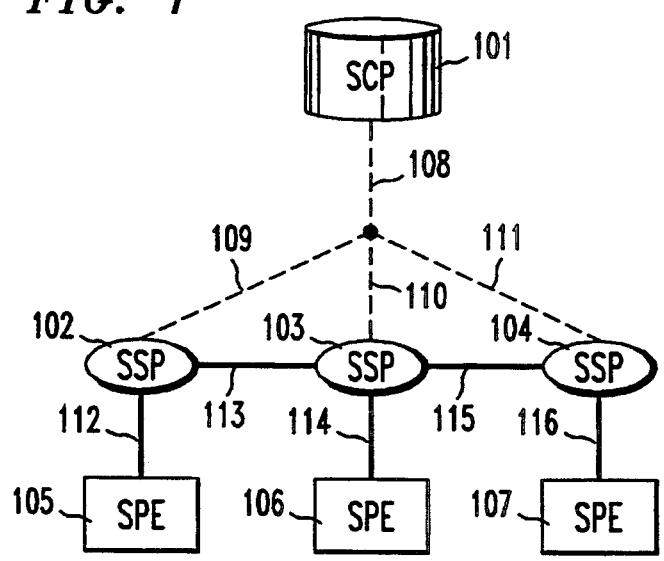
FIG. 1 shows, in simplified block diagram form, an intelligent switched telecommunication network which facilitates the practice of the invention.

FIG. 1 shows an example of an intelligent switched broadband/multimedia public telecommunication network which facilitates the practice of the invention. The network includes SCP 101, service switching points ("SSPs") 102, 103 and 104, and subscriber premises equipment ("SPE") 105, 106 and 107. As is known in the art, a call within an intelligent switched public telecommunication network is effected in response to control signals. In FIG. 1, these control signals are passed between SCP 101, SSP 102, SSP 103 and SSP 104 via signalling paths 108, 109, 110 and 111 (shown as dotted lines). In response to these signals, the SSPs reconfigure the telecommunication network to create a specific call topology and achieve the desired subscriber-to-subscriber connections via transport paths 112, 113, 114, 115 and 116 (shown as bold solid lines). These transport paths may be adapted to facilitate voice, data, and/or video communication between the network subscribers.

In effecting a given call topology within an intelligent switched broadband/multimedia public telecommunication network, two separate configurations are established—a call configuration ("CL-C"), and a connection configuration ("CN-C"). A CL-C defines the association between the parties to be involved in a call, and verifies that all of the desired parties to a call are able to participate in the call. CN-Cs establish the particular type of connections (i.e., audio, video, data . . . ) between the parties to a call. An individual CN-C defines a particular connection configuration, or a particular transition between existing connection configurations. Some examples of the connections/transitions which a CN-C might represent are video connections, multiparty conferencing calling, digital data transfer between parties, etc. There may be more than one CN-C associated with a given call; each establishing or modifying a particular type of connection between two or more parties. In this manner, very complex calls, involving multiple parties and a variety of media (voice, video, data . . . ), can be "built" from a number of simple CN-C components.

The process of effecting a call in which SPE 105 is linked via a bidirectional audio and video connection to SPE 106, and SPE 105, SPE 106 and SPE 107 are linked via a bidirectional audio connection will illustrate a particular application of the invention within the intelligent switched broadband/multimedia public telecommunication network of FIG. 1. The network subscriber utilizing SPE 105 initiates the call by sending a call topology request to setup a call to SSP 102. SSP 102 then sends the topology request to SCP 101 via signalling paths 108 and 109 (automatic transmission of such requests from an SSP to an SCP is typical within intelligent public telecommunication networks). Upon receipt of the topology request, SCP 101 generates a high-level call control message which contains information as to the identity of the parties to be included in the call, and a request for a particular CL-C which defines the association between the parties to be involved in a call (for this example, the CL-C designated CL-C$_2$ is being requested). This high-level call control message is then transmitted to requesting SSP 102 via signalling paths 108 and 109.

Figure 2:
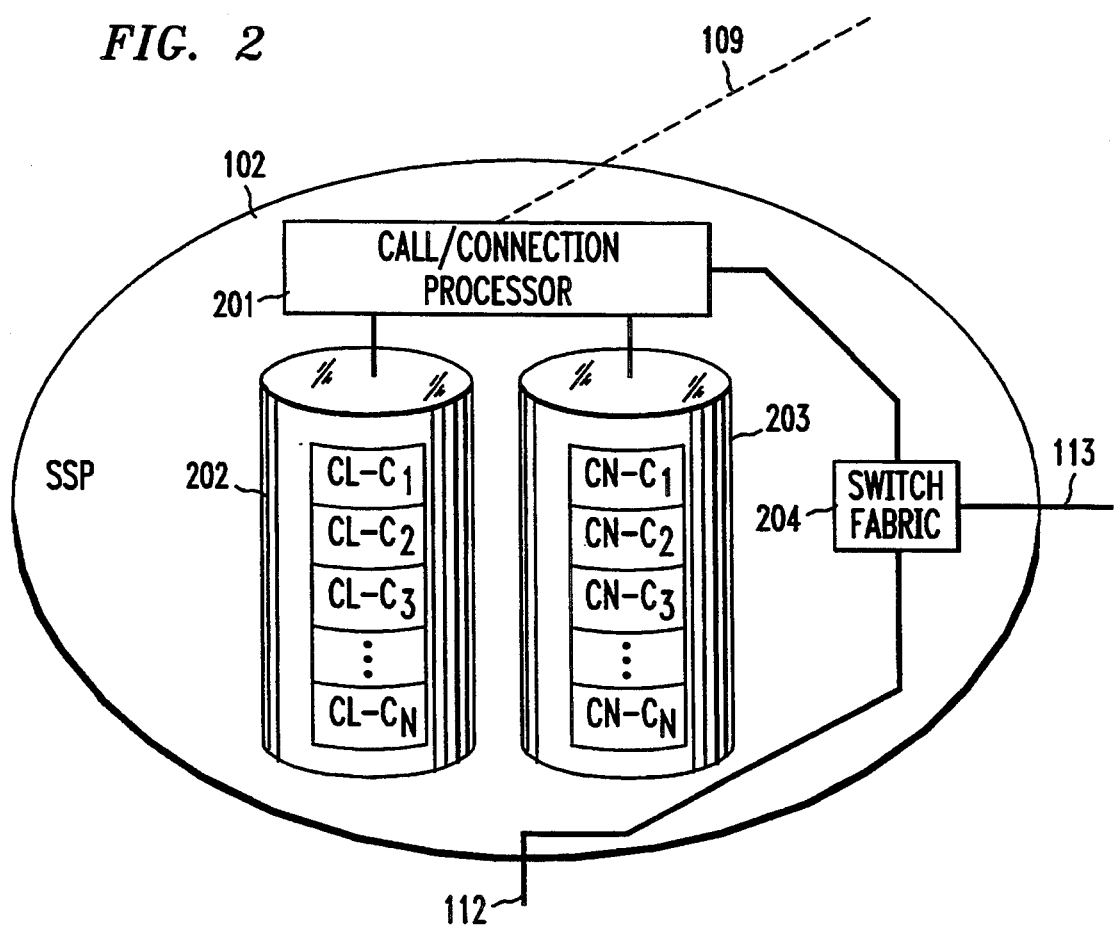
FIG. 2 shows, in simplified block diagram form, the internal architecture of service switching point 102 of FIG. 1.

FIG. 2 shows, in simplified block diagram form, the internal architecture of SSP 102 of FIG. 1. As shown, SSP 102 includes call/connection processor 201, CL-C memory 202, CN-C memory 203, and switch fabric 204. Control messages received by SSP 102 via signalling path 109 are processed and ultimately passed to switch fabric 204, thereby controlling the connectivity provided by switch fabric 204. Program-controlled electronic switching systems such as SSP 102 are known and commercially available. An example of one such switching system is the 4 ESS ™ switch manufactured by AT&T, and described in The Bell System Technical Journal, Vol. 56, No. 7, September 1977. Both SSP 103 (FIG. 1) and SSP 104 (FIG. 1) have the same basic architecture and operating characteristics as SSP 102.

Upon receipt of the high-level call control message from SCP 101, call/connection processor 201 within SSP 102 recalls CL-C$_2$ (the requested CL-C) from CL-C memory 202, and executes the instructions contained therein. CL-C memory 202 is a storage area containing a number of pre-programmed software modules designated CL-C$_1$ through CL-C$_n$—each of which defines a specific CL-C. Software module CL-C$_2$ causes call/connection processor 201 to send a message to SSP 103 and a message to SSP 104 (via signalling paths 109, 110, and 111). The message sent to SSP 103 requests confirmation that SPE 106 isn't already engaged in a call (i.e., "busy"), and that it is capable of accommodating the desired connections (a bidirectional audio and video link to SPE 102 and a bidirectional audio link to SPE 10). The message sent to SSP 104 requests confirmation that SPE 107 isn't busy, and that it too is capable of accommodating the desired connections (a bidirectional audio link to SPE 102 and SPE 103).

If the either SPE 103 or SPE 104 can't participate in the requested call, a negative confirmation message is returned to SPE 102 via the signalling paths, and the call request fails. However, assuming that both SPE 103 and SPE 104 are not busy, and can accommodate the desired connections, two affirmative confirmation messages are returned to SPE 102. In response to these affirmative confirmation messages, SSP 102 transmits a clearance signal to SCP 101. This clearance signal informs SCP 101 that the desired participants for the requested call are ready and able to accommodate the connections required for that call.

Upon receipt of the clearance signal, SCP 101 generates a high-level connection control message which contains a request for the particular set of CN-Cs needed to effect the network connectivity required to support the requested call. For this example, assume three CN-Cs (CN-C$_1$, CN-C$_2$ and CN-C$_3$) are required. This high-level connection control message is then transmitted to requesting SSP 102 via signalling paths 108 and 109. As a result of the high-level connection control message from SCP 101, call/connection processor 201 within SSP 102 recalls the requested CN-Cs from CN-C memory 203, and executes the instructions contained therein. CN-C memory 202 is a storage area containing a number of preprogrammed software modules designated CN-C$_1$ through CN-C$_n$. Each of these modules defines a specific CN-C which may be used to instruct SSPs within the telecommunication network to provide the connectivity required to support a requested call. The CN-Cs stored within CN-C memory 202 are a small subset of standard configurations achievable within the telecommunication network of FIG. 1 (the specific CN-Cs stored within a given telecommunication system will be a function of the type of connections which the system is foreseeably expected to accommodate). Execution of a stored CN-Cs causes one or more commands (similar to those disclosed in the Bellcore Advisory TA-NWT-001112) to be issued to one or more SSPs within the telecommunication network. Software module $CN-C_1$ effects a bidirectional video connection between SPE 105 and SPE 106, and software module $CN-C_2$ effects a bidirectional audio connection between SPE 105 and SPE 106. Software module $CN-C_3$ effects a bidirectional audio connection between SPE 105, SPE 106 and SPE 107.

Both $CN-C_1$ and $CN-C_2$ involve connections between SPE 105 and SPE 106. Consequently, the execution of these CN-Cs by call/connection processor 201 will cause instructions to be sent to switch fabric 204 of SSP 102 (the SSP that interfaces with SPE 105). In response to these instructions, switch fabric 204 will effect the proper connections to SPE 105 to support the requested audio and video link. In addition, the execution of these CN-Cs by call/connection processor 201 will cause instructions to be transmitted, via signalling paths 109 and 110, from SSP 102 to SSP 103 (the SSP that interfaces with SPE 106). The transmitted instructions will be processed by a call/connection processor within SSP 103, and result in the switch fabric of SSP 103 effecting connections to SPE 106 that support the requested audio and video link.

$CN-C_3$ effects a bidirectional audio connection between SPE 105, SPE 106 and SPE 107. This type of CN-C, referred to as a transition, is a request to change an existing connection configuration. In this case, $CN-C_3$ requests a transition from the existing audio connection setup between SPE 105 and SPE 106, to a "three-way" or "conference" audio connection which includes SPE 107. Consequently, the execution of $CN-C_3$ a by call/connection processor 201 causes instructions to be transmitted, via signalling paths 109, 110 and 111, from SSP 102 to SSPs 103 and 104 (these SSPs interface with SPE 106 and SPE 107, respectively). The transmitted instructions will be processed by a call/connection processors within SSP 103 and SSP 104. In response, the switch fabrics of SSP 103 and SSP 104 will effect an audio connection which links SPE 107 to the pre-existing audio connection between SPE 105 and SPE 106. At this point, a confirmation signal is transmitted from requesting SSP 102 to SCP 101, signifying completion of the requested call.

By employing a flexible system of CL-Cs and CN-Cs stored within network SSPs, the above technique enables broadband/multimedia to be established within a switched intelligent public telecommunication network, without the need for the transmission of long series of individual low-level commands to or from network SSPs.

The above described technique provides for establishing broadband/multimedia call connections in an efficient and simple manner. It will be understood that the particular methods and systems described are only illustrative of the principles of the present invention, and that various modifications could be made by those skilled in the art without departing from the scope and spirit of the present invention, which is limited only by the claims that follow. One such modification might include employing an adjunct linked to a network SSP to perform the processing and/or storage functions of the program-controlled SSPs described above. Another modification might include employing the invention within a private telecommunication network. Yet another modification might include the practicing of the invention in a telecommunication system wherein commands being sent between SCPs and SSPs are first routed through an intermediate service transfer point or processor. The invention might also be practiced within telecommunication networks wherein the functions performed by the SCP in the above described example (i.e., the reception/processing of control signals, and the generation/transmission of high-level call/connection control messages) are performed within one or more program-controlled SSPs. This would naturally eliminate the need for transmitting various control messages between the SSPs and an SCP. In all of the above embodiments, the high-level call control message and the high-level connection control message could be transmitted as a single command message. In such a system, the SSPs would store the single command message and respond to the call and connection components in a manner similar to that described above.

We claim:

1. A method for effecting a broadband/multimedia call among a group of desired participants within an intelligent switched telecommunication network, comprising the steps of:

generating a high-level call control message in response to a call topology request;

executing one or more call configuration processes in response to said call topology request, thereby determining if said desired participants can accommodate the requested broadband/multimedia call;

generating a high-level connection control message, if as a result of the execution of said call configuration processes it is determined that said desired participants can accommodate the requested broadband/multimedia call; and executing one or more connection configuration processes in response to said call topology request and said high-level call control message and high-level connection control message, thereby effecting interconnections within said intelligent switched telecommunication network which will support the requested broadband/multimedia call.

2. The method of claim 1 wherein each execution of a connection configuration process effects the transition from one state of network connectivity to another state of network connectivity.

3. The method of claim 1 wherein each of said connection configuration processes is one of a fixed collection of configuration processes achievable within said intelligent switched telecommunication network.

4. A method for effecting a broadband/multimedia call among a group of desired participants within an intelligent switched telecommunication network, comprising the steps of:

receiving a call topology request from one of said desired participants;

generating a high-level call control message in response to a said received call topology request;

executing one or more pre-programmed call configuration processes in response to said call topology request, thereby determining if said desired participants can accommodate the requested broadband/multimedia call;

generating a high-level connection control message, if as a result of the execution of said call configuration processes it is determined that said desired participants can accommodate the requested broadband/multimedia call; and executing one or more pre-programmed connection configuration processes in response to said call topology request and said high-level control message and said high-level connection control message, thereby effecting interconnections within said intelligent switched telecommunication network which will support the requested broadband/multimedia call.

5. The method of claim 4 wherein each execution of a connection configuration process effects the transition from one state of network connectivity to another state of network connectivity.

6. The method of claim 4 wherein each of said connection configuration processes is one of a fixed collection of configuration processes achievable within said intelligent switched telecommunication network.

7. A method for effecting a broadband/multimedia call among a group of desired participants within an intelligent switched telecommunication network, comprising the steps of:

generating a high-level control message containing a call control message and a connection control message in response to a call topology request;

executing one or more call configuration processes in response to said call topology request, thereby determining if said desired participants can accommodate the requested broadband/multimedia call;

executing one or more connection configuration processes in response to said call topology request and said high-level control message if as a result of the execution of said call configuration processes it is determined that said desired participants can accommodate the requested broadband/multimedia call, thereby effecting interconnections within said intelligent switched telecommunication network which will support the requested broadband/multimedia call.

8. The method of claim 7 wherein each execution of a connection configuration process effects the transition from one state of network connectivity to another state of network connectivity.

9. The method of claim 7 wherein each of said connection configuration processes is one of a fixed collection of configuration processes achievable within said intelligent switched telecommunication network.

10. A method for effecting a broadband/multimedia call among a group of desired participants within an intelligent switched telecommunication network, comprising the steps of:

receiving a call topology request from one of said desired participants;

generating a high-level control message containing a call control message and a connection control message in response to said received call topology request;

executing one or more call configuration processes in response to said call topology request a said high-level control message, thereby determining if said desired participants can accommodate the requested broadband/multimedia call;

executing one or more connection configuration processes in response to said call topology request a said high-level control message if as a result of the execution of said call configuration processes it is determined that said desired participants can accommodate the requested broadband/multimedia call, thereby effecting interconnections within said intelligent switched telecommunication network which will support the requested broadband/multimedia call.

11. The method of claim 10 wherein each execution of a connection configuration process effects the transition from one state of network connectivity to another state of network connectivity.

12. The method of claim 10 wherein each of said connection configuration processes is one of a fixed collection of configuration processes achievable within said intelligent switched telecommunication network.

* * * * *